(12) United States Patent
Kurian et al.

(10) Patent No.: US 9,772,873 B2
(45) Date of Patent: *Sep. 26, 2017

(54) GENERATING PROCESS TEMPLATES WITH CONFIGURABLE ACTIVITY PARAMETERS BY MERGING EXISTING TEMPLATES

(71) Applicant: Bank of America Corporation, Charlotte, NC (US)

(72) Inventors: Manu Kurian, Dallas, TX (US); Sorin N. Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,579

(22) Filed: Apr. 7, 2017

(65) Prior Publication Data

US 2017/0212782 A1   Jul. 27, 2017

Related U.S. Application Data

(63) Continuation-in-part of application No. 15/384,473, filed on Dec. 20, 2016, which is a continuation-in-part of application No. 14/698,901, filed on Apr. 29, 2015, now Pat. No. 9,558,031.

(51) Int. Cl.
*G06F 9/46* (2006.01)
*G06F 9/445* (2006.01)
*H04L 12/24* (2006.01)

(52) U.S. Cl.
CPC ............... *G06F 9/46* (2013.01); *G06F 8/65* (2013.01); *H04L 41/0813* (2013.01)

(58) Field of Classification Search
CPC ........... G06F 9/46; G06F 8/65; H04L 41/0813
See application file for complete search history.

(56) References Cited

U.S. PATENT DOCUMENTS

| | | |
|---|---|---|
| 7,555,551 B1 | 6/2009 | McCorkendale et al. |
| 8,065,676 B1 | 11/2011 | Sahai et al. |
| 8,122,282 B2 | 2/2012 | Betzler et al. |
| 8,141,090 B1 | 3/2012 | Graupner et al. |
| 8,595,328 B2 | 11/2013 | Murakami et al. |
| 8,635,425 B1 | 1/2014 | Adogla et al. |
| 8,639,787 B2 | 1/2014 | Lagergren et al. |

(Continued)

*Primary Examiner* — Benjamin Wu
(74) *Attorney, Agent, or Firm* — Banner & Witcoff, Ltd.; Michael A. Springs

(57) ABSTRACT

A centralized controller may include at least one processor, a memory and a communication interface. The centralized controller may configure a computing system in a single deployment of an executable process. The executable process may include multiple executable instances associated with one of multiple different templates for the executable process. Each template may include multiple user-configurable parameters. A user may request a template associated with a first executable instance and update the template using the user-configurable parameters. The centralized controller may generate a second executable instance of the executable process and a second template associated with the second executable instance based on the updated template. The centralized controller may reconfigure the computing system based on the second executable instance of the executable process while maintaining the configuration of the computing system based on the first executable instance.

20 Claims, 8 Drawing Sheets

(56) References Cited

U.S. PATENT DOCUMENTS

| | | |
|---|---|---|
| 8,671,404 B2 | 3/2014 | DeHaan et al. |
| 8,732,693 B2 | 5/2014 | Mutisya et al. |
| 8,800,055 B2 | 8/2014 | Murakami et al. |
| 8,924,526 B1 | 12/2014 | Levy et al. |
| 9,182,974 B1 | 11/2015 | Voronkov et al. |
| 2005/0138228 A1 | 6/2005 | Hornback et al. |
| 2007/0150329 A1 | 6/2007 | Brook et al. |
| 2007/0150882 A1 | 6/2007 | Pena et al. |
| 2007/0220505 A1 | 9/2007 | Bukovec et al. |
| 2010/0192143 A1 | 7/2010 | Ingle et al. |
| 2010/0241990 A1 | 9/2010 | Gabriel et al. |
| 2011/0023012 A1 | 1/2011 | Khader et al. |
| 2011/0078680 A1 | 3/2011 | Lagergren et al. |
| 2011/0113413 A1 | 5/2011 | Ewington et al. |
| 2011/0113424 A1 | 5/2011 | Ewington et al. |
| 2011/0154320 A1 | 6/2011 | Verma |
| 2011/0213687 A1 | 9/2011 | Ferris et al. |
| 2011/0214124 A1 | 9/2011 | Ferris et al. |
| 2011/0276951 A1 | 11/2011 | Jain |
| 2012/0054742 A1 | 3/2012 | Eremenko et al. |
| 2012/0089972 A1 | 4/2012 | Scheidel et al. |
| 2012/0311579 A1 | 12/2012 | Lee et al. |
| 2013/0145367 A1 | 6/2013 | Moss et al. |
| 2013/0227089 A1 | 8/2013 | McLeod et al. |
| 2013/0232497 A1 | 9/2013 | Jalagam et al. |
| 2014/0137114 A1 | 5/2014 | Bolte et al. |
| 2014/0207927 A1 | 7/2014 | Fichtenholtz et al. |
| 2014/0337502 A1 | 11/2014 | Cahill et al. |
| 2014/0359617 A1 | 12/2014 | Fontignie et al. |
| 2015/0074659 A1 | 3/2015 | Madsen et al. |
| 2015/0089494 A1 | 3/2015 | Beak et al. |
| 2015/0142878 A1 | 5/2015 | Hebert et al. |
| 2015/0331707 A1 | 11/2015 | Hellkvist et al. |
| 2016/0092196 A1 | 3/2016 | Kuchibhotla et al. |
| 2016/0110183 A1 | 4/2016 | Fu et al. |
| 2016/0132299 A1 | 5/2016 | Harrison |
| 2016/0259795 A1 | 9/2016 | Brandys et al. | ions is incorporated by reference 15
GENERATING PROCESS TEMPLATES WITH CONFIGURABLE ACTIVITY PARAMETERS BY MERGING EXISTING TEMPLATES

CROSS-REFERENCE TO RELATED APPLICATIONS

This application is a continuation-in-part of and claims priority to U.S. patent application Ser. No. 15/384,473, filed Dec. 20, 2016, and entitled "EXECUTABLE PROCESS-MANAGEMENT ENGINES," which is a continuation of and claims priority to U.S. patent application Ser. No. 14/698,901, filed Apr. 29, 2015, and entitled "EXECUTABLE PROCESS-MANAGEMENT ENGINES." Each of the foregoing applications is incorporated by reference herein in its entirety.

BACKGROUND

Many large organizations utilize process management to manage various processes (e.g., design, model, execute, monitor, optimize, and reengineer) over their lifecycles. Conventional (e.g., software and database based) approaches to process management have become increasingly rigid, resulting in an inability to adapt to various different scenarios (e.g., use cases, and the like). As a result, an organization may have to deploy multiple different solutions to cover each differing scenario, resulting in excess cost, as well as slower and longer deployments. Accordingly, a need exists for executable process-management engines.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a centralized controller may include at least one processor, a memory and a communication interface. The centralized controller may configure a computing system in a single deployment of an executable process. The executable process may include multiple executable instances corresponding to different sets of structured activities. Each executable instance may be associated with one of multiple different templates for the executable process. Each template may include multiple user-configurable parameters including at least an add new structured activity parameter, a modify a structured activity parameter, and a remove a structured activity parameter. The centralized controller may receive a request for a particular template from a group of multiple templates and, in response, may output the particular template, which may be associated with a particular executable instance of the executable process. The centralized controller may receive an updated template associated with the particular template, which may include an update to the particular template via one or more of the multiple user-configurable parameters. The centralized controller may generate a second executable instance of the executable process and a second template associated with the second executable instance based on the update template. The centralized controller may reconfigure the computing system based on the second executable instance of the executable process while maintaining the configuration of the computing system based on the first executable instance. The centralized controller may execute the second executable instance of the executable process on a user-specified data set.

In some embodiments, the centralized controller may, in response to receiving a request for the second template, output the second template to the user. The centralized controller may receive an updated second template associated with the second template. The updated second template may include an update to the second template via one or more of its plurality of user-configurable parameters. The centralized controller may generate a third executable instance of the executable process and a third new template associated with the third executable instance based on the updated second template. The centralized controller may reconfigure the computing system based on the third executable instance of the executable process while maintaining the configuration of the computing system based on the second executable instance. The centralized controller may execute the third executable instance of the executable process on a different user-specified data set.

In accordance with one or more embodiments, an apparatus may include a processor and a memory storing computer-readable instructions that, when executed by the processor, cause the apparatus to perform a number of steps. The apparatus may configure a computing system in a single deployment of multiple executable instances corresponding to different sets of structured activities. Each executable instance may be associated with a template comprising multiple user-configurable parameters at least including an add new structured activity parameter, a modify a structured activity parameter, and a remove a structured activity parameter. In response to receiving a request for a first template from a first device, the apparatus may output the first template associated with a first executable instance to the first device. The apparatus may receive an updated first template associated with the first template from the first device. The updated first template may include an update to the first template via one or more of the plurality of user-configurable parameters. The apparatus may generate a second executable instance and a second template associated with the second executable instance based on the updated first template. The apparatus may reconfigure the computing system based on the second executable instance while maintaining the configuration of the computing system based on the first executable instance. In response to receiving a request for the second template from a second device, the apparatus may output the second template to the second device.

In accordance with one or more embodiments, a system may include one or more computing devices and a centralized controller, which may include a processor and a memory storing instructions that, when executed by the processor, cause the centralized controller to perform a number of steps. The centralized controller may store multiple templates with each template being associated with a different executable instance and including a plurality of user-configurable parameters. The centralized controller may configure the one or more computing devices using a single image of the executable instances. In response to receiving a request for a template from a computing device of the one or more computing devices, the centralized controller may send the template to the computing system. In response to receiving an update to the template from the computing system, the centralized controller may generate a new executable instance based on the update and reconfigure the one or more computing devices using an updated single image comprising at least the new executable instance.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
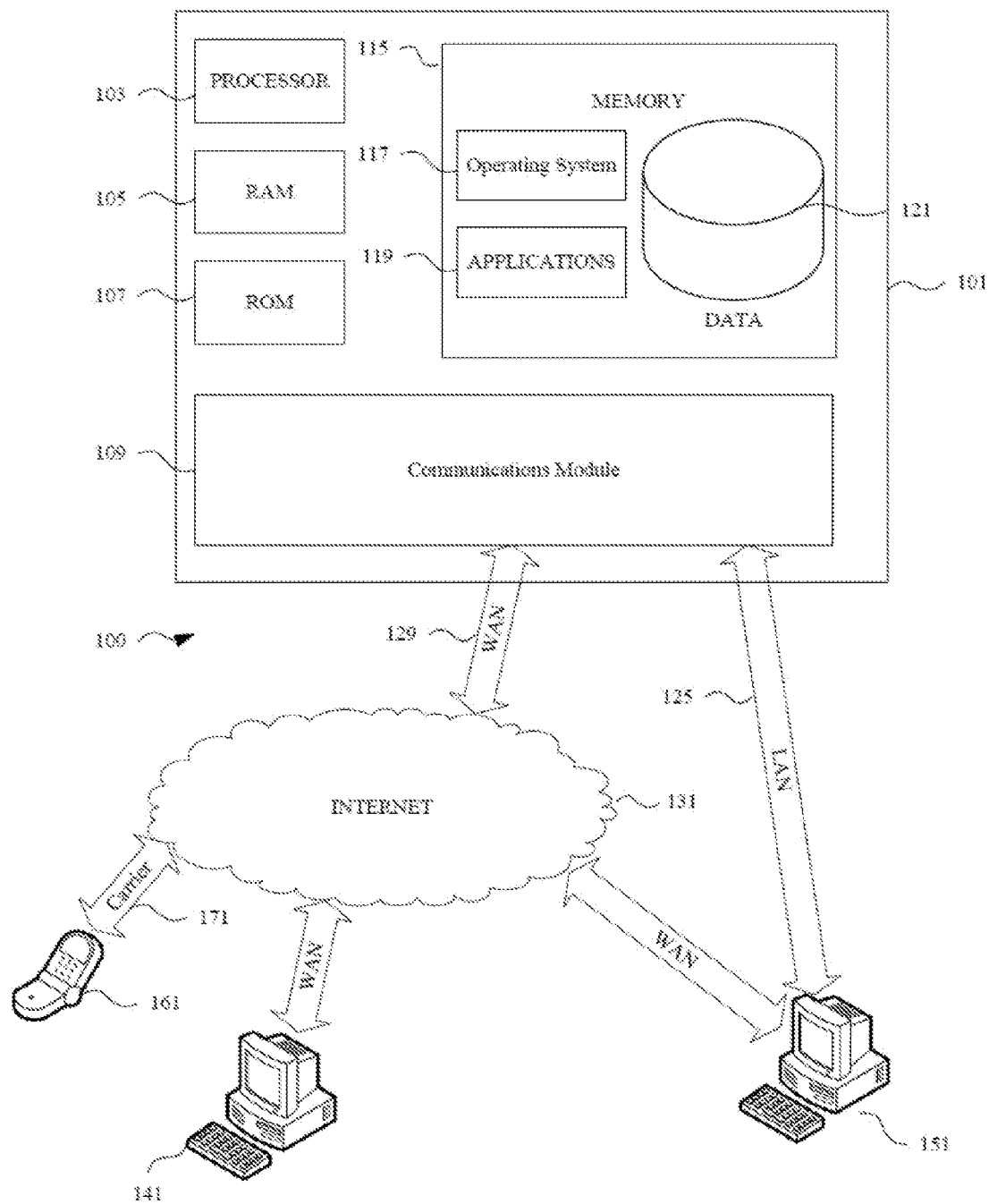
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, one or more aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. A web browser may be used to display and manipulate data on web pages.

Some aspects of the disclosure are operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
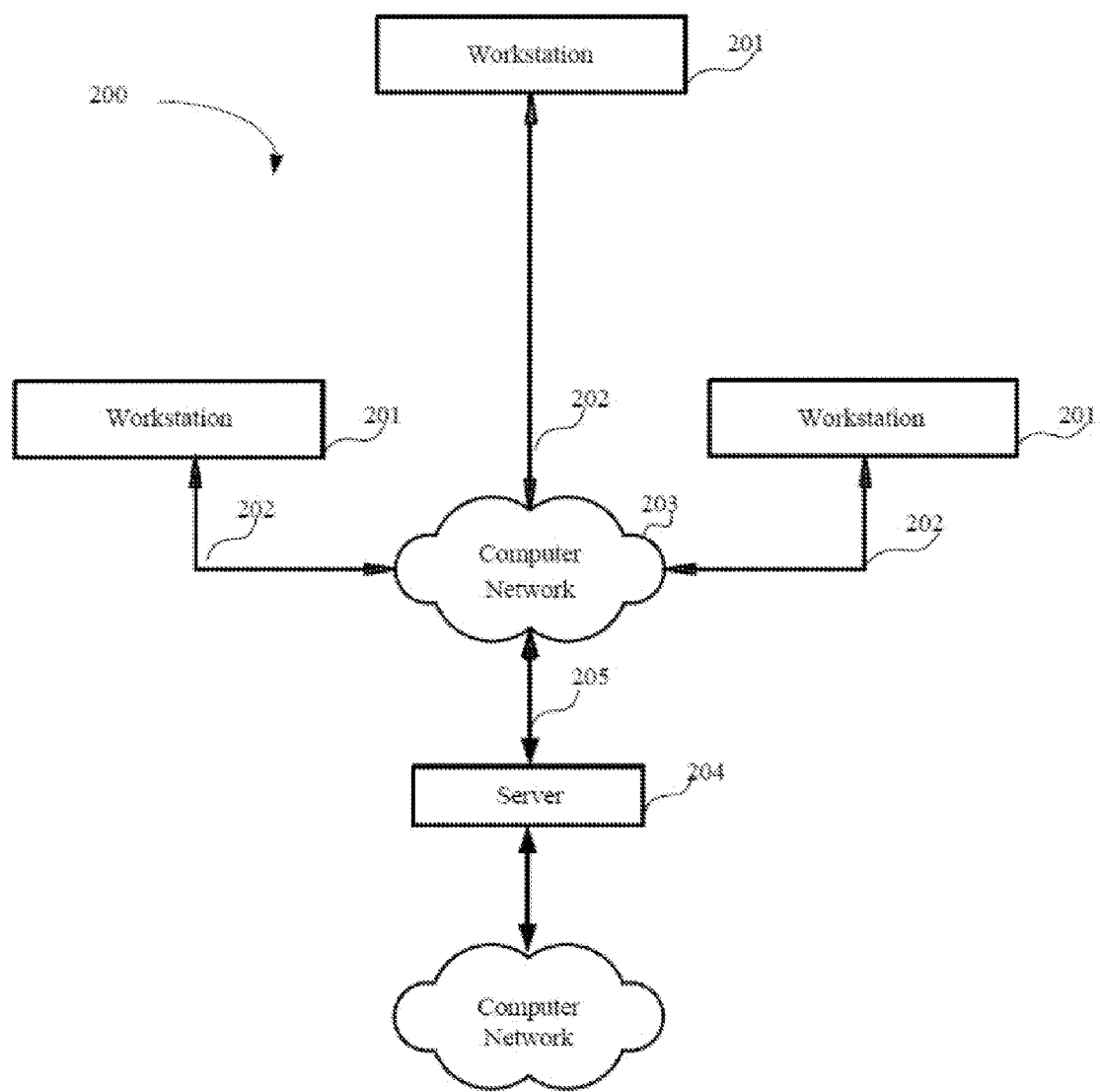
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
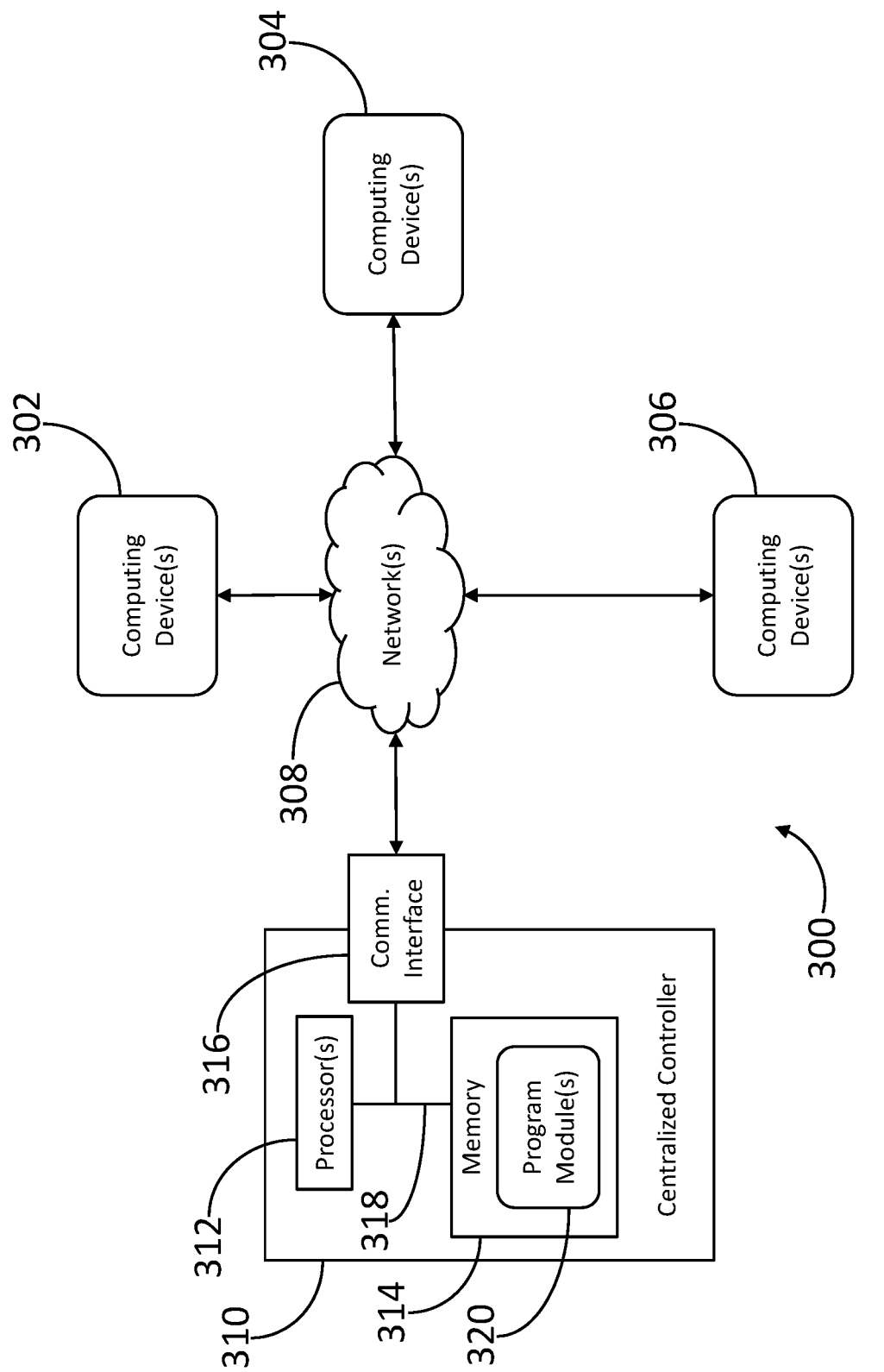
FIG. 3 depicts an illustrative computing system for deploying and managing executable process-management engines in accordance with one or more example embodiments.

FIG. 3 depicts an illustrative computing system for deploying and managing executable process-management engines in accordance with one or more example embodiments. Referring to FIG. 3, computing system 300 may be associated with one or more organizations (e.g., corporations, universities, government entities, healthcare providers, financial institutions, or the like) and may include one or more computing devices. For example, computing system 300 may include computing devices 302 (e.g., associated with a first division of an organization), computing devices 304 (e.g., associated with a second division of the organization), and computing devices 306 (e.g., associated with a third division of the organization). Computing devices 302-306 may include one or more of any type of computing device (e.g., desktop computer, laptop computer, tablet computer, smart phone, server, server blade, mainframe, virtual machine, or the like) configured to perform one or more of the functions described herein. Computing system 300 may also include one or more networks. For example, computing system 300 may include network(s) 308, which may include one or more sub-networks (e.g., LANs, WANs, VPNs, or the like) and may interconnect one or more of computing devices 302, computing devices 304, and computing devices 306.

Computing system 300 may include centralized controller 310. Centralized controller 310 may include one or more of any type of computing device (e.g., desktop computer, laptop computer, tablet computer, smart phone, server, server blade, mainframe, virtual machine, or the like) configured to perform one or more of the functions described herein. Centralized controller 310 may include one or more processor(s) 312, memory 314, communication interface 316, and/or data bus 318. Data bus 318 may interconnect processor(s) 312, memory 314, and/or communication interface 316. Communication interface 316 may be a network interface configured to support communication between centralized controller 310 and network(s) 308 (or one or more sub-networks thereof). Memory 314 may include one or more program modules comprising instructions that when executed by processor(s) 312 cause centralized controller 310 to perform one or more functions described herein. For example, memory 314 may include program module(s) 320, which may comprise instructions that when executed by processor(s) 312 cause centralized controller 310 to perform one or more functions described herein. Computing devices 302-306 may include one or more of the components described above with respect to centralized controller 310.

Figure 4A:
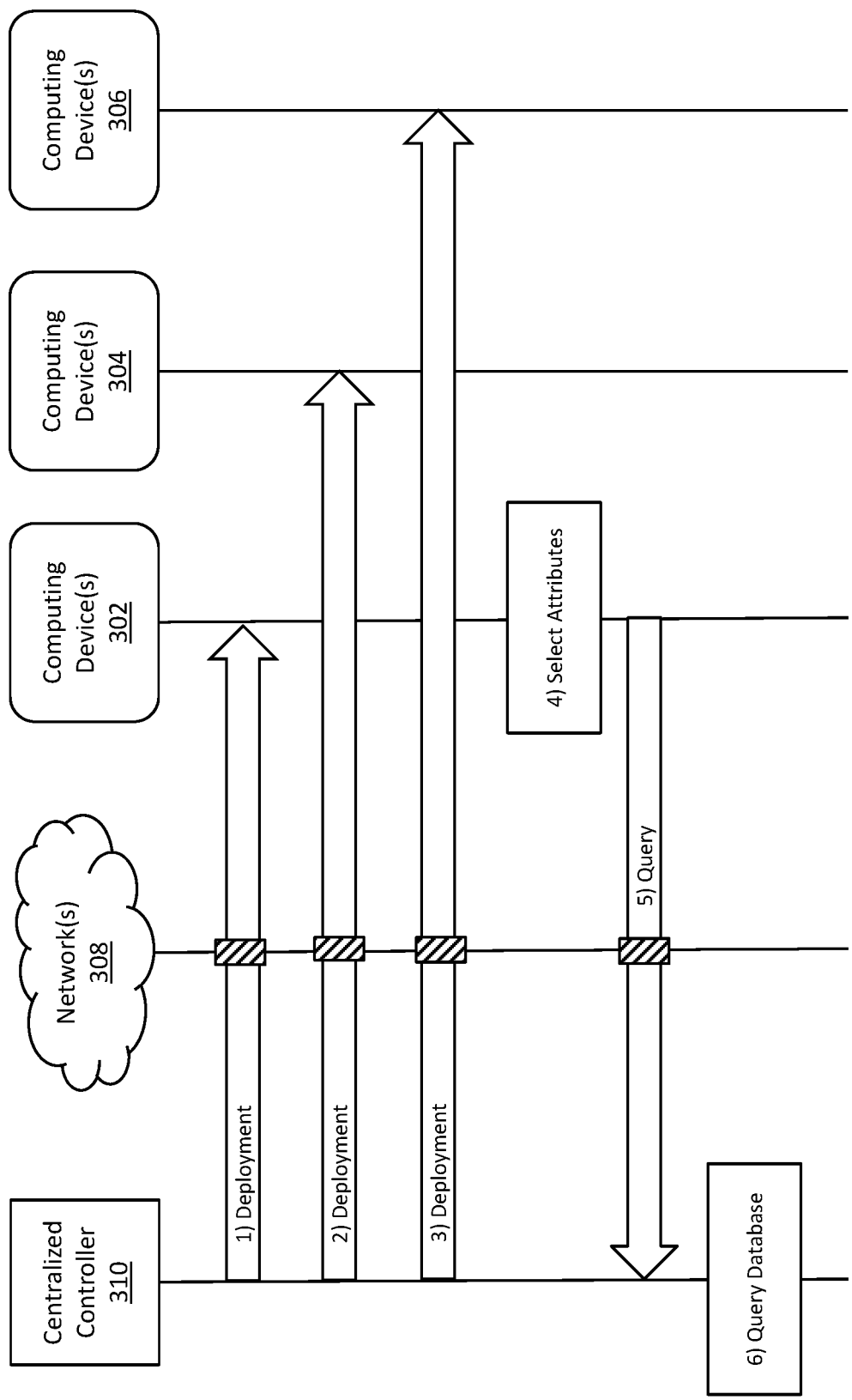
FIG. 4A, FIG. 4B, FIG. 4C, and FIG. 4D depict an illustrative event sequence for deploying and managing executable process-management engines in accordance with one or more example embodiments.
Figure 4B:
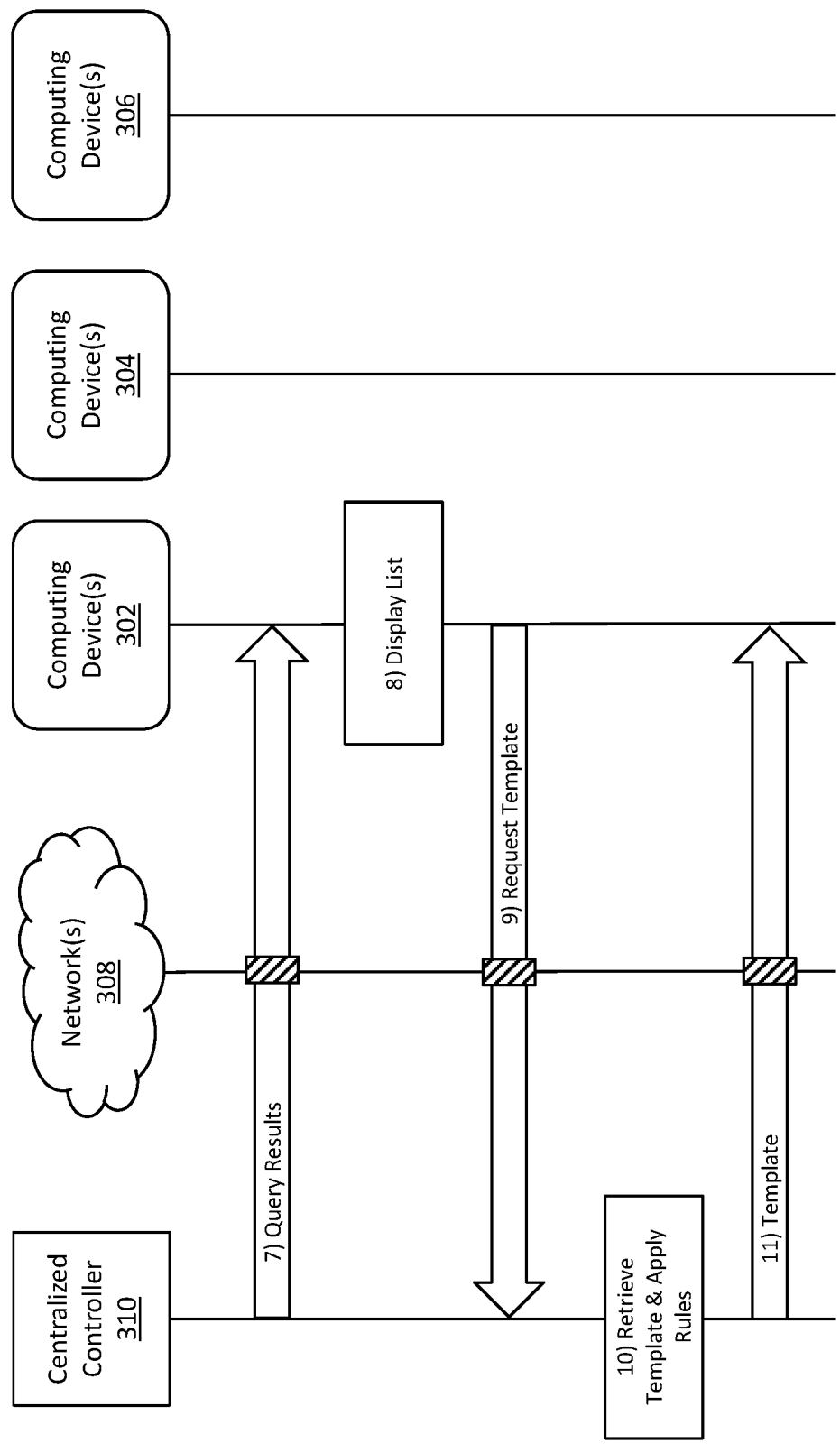
Figure 4C:
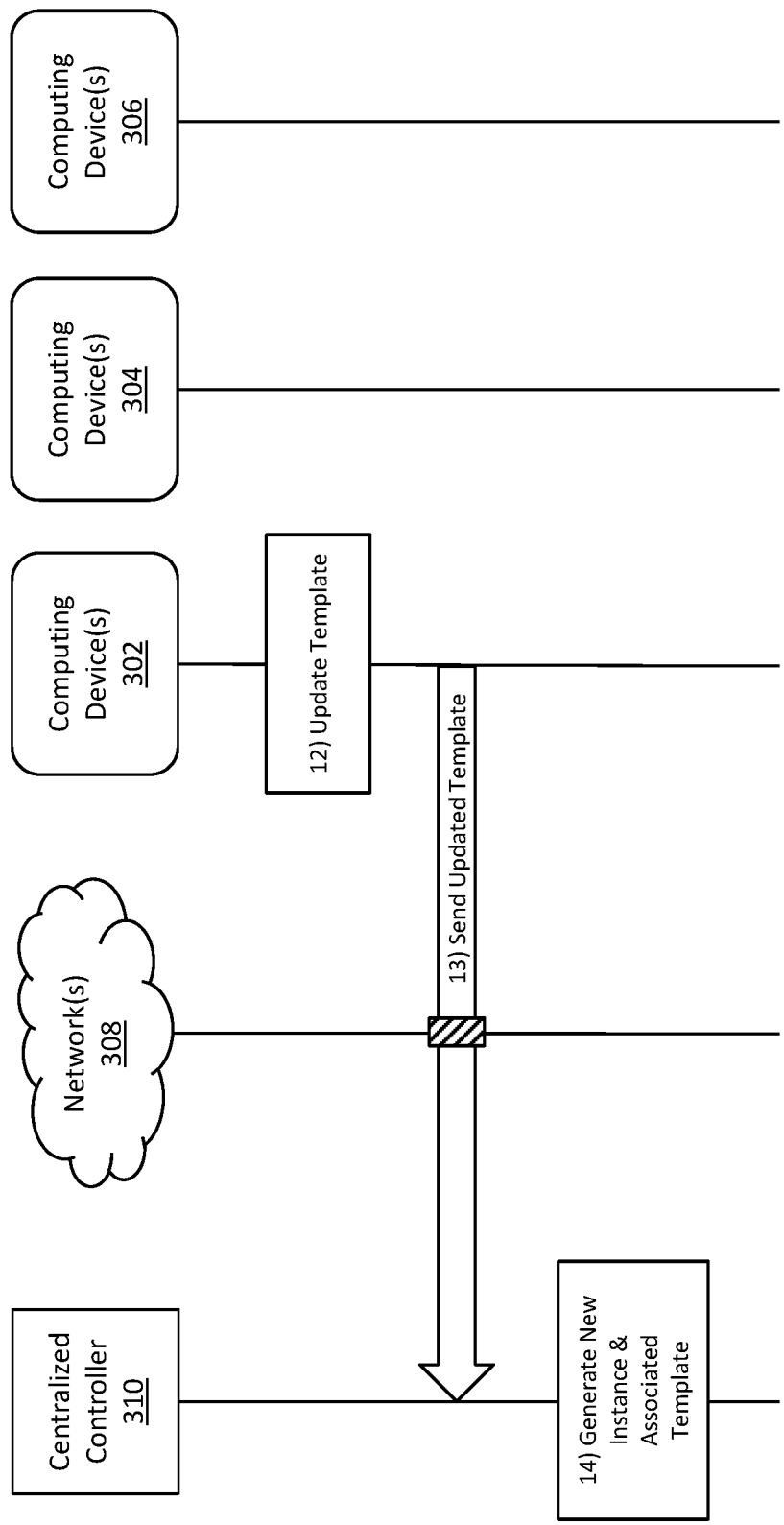

FIG. 4A, FIG. 4B, FIG. 4C, and FIG. 4D depict an illustrative event sequence for deploying and managing executable process-management engines in accordance with one or more example embodiments. Referring to FIG. 4A, at steps 1-3, centralized controller 310 may configure computing system 300 in a single deployment of an executable process (e.g., an executable process associated with business process management (BPM) software, a BPM database, or the like). As shown in FIG. 4A, centralized controller 310 may, in step 1, deploy an executable process configuration to computing devices 302 for installation by computing devices 302. In the same deployment, centralized controller 310 may, in step 2, deploy the configuration to computing devices 304 for installation by computing devices 304. In the same deployment, centralized controller 310 may, in step 3, deploy the configuration to computing devices 306 for installation by computing devices 306. While the deployment is shown in three steps, centralized controller 310 may configure computing system 300 in a single deployment by deploying the same configuration to each of the computing devices 302-306. In some embodiments, the configuration may be sent to each of the computing devices 302-306 substantially contemporaneously (e.g., within a preset timeframe). By using a single deployment package (e.g., a single image) to deploy the configuration, the computing system 300 may eliminate multiple separate manual deployments and reduce overhead.

The configuration may include one or more processes to accomplish one or more objectives of an organization. A process may be a workflow of structured sets of activities. As an example, the process may include multiple structured activities (e.g., tasks, processing events, or the like) that are interconnected by logical directional arrows, which may represent a handoff of data between the structured activities. That is, an output of one activity may be used as an input for another activity. The handoffs may correspond to a one-to-one relationship, a one-to-many relationship, a many-to-one relationship, and/or a many-to-many relationship of the objects. In one or more arrangements, the process may be in the form of an executable instance (e.g., an executable software function, application, module, or the like). In such arrangements, the process may be represented by a directed graph with each node/object of the directed graph representing a structured task, and each edge of the directed graph representing a relation between the objects. A computing system (e.g., computing devices 302, 304, 306) may execute the executable instance to perform and/or otherwise implement the process of the organization and accomplish a goal or objective of the organization. For instance, each process (and therefore each executable instance) may correspond to various different scenarios (e.g., use cases) a computing system or person of the organization may encounter.

As an example, one process may be for setting up a bank account at a financial institution. In such an example, the associated set of structured activities may be performed in the following order: receiving a request to setup a bank account from an applicant, publishing a webpage including fields to receive information from the applicant, receiving the applicant's information via the webpage, creating an account within an account database of the financial institution, and sending a notification to the applicant that his or her account has been created. A computing system (e.g., computing devices 302-306) may execute the executable instance (e.g., instruction) to, for example, cause the computing system to perform one or more of the structured activities (e.g., publish a webpage, create an account, or the like) to cause a bank account for the applicant to be set up.

As another example, one process may be for a loan application. Such a process workflow may include many different structured activities, which may be performed in the following order: receiving the applicant's information via a published webpage including fields to receive information from the applicant or retrieving the applicant's information from a database of the financial institution, retrieving the applicant's credit score and other information from a third-party entity, analyzing the user's information, determining whether the loan has been approved based on the analysis, and outputting the result to the applicant. A computing system (e.g., computing devices 302-306) may execute the executable-instance (e.g., instruction) to, for example, cause the computing system to perform one or more of the activities (e.g., retrieve user's credit score, analyze information, or the like) to determine whether the bank should grant the applicant a loan, and under what conditions.

Once deployed, each of computing devices 302-306 may generate data (e.g., data for one or more graphical user interfaces) configured to present users with one or more process of the organization in an executable format. For instance, the data may include a displayable object (e.g., a scrollable list, table, or the like) so that a user may view a brief description of one or more executable instances and select an executable instance for execution to accomplish various objectives of the organization. For instance, computing devices 302-306 may apply one or more datasets to the executable instances to perform tests and/or accomplish an objective. In some instances, receiving a particular input may trigger an executable instance. Following the setting up of an account example discussed above, receiving a user request to set up an account at a computing system may trigger the computing system to execute the executable instance associated with the process of setting up an account.

The configuration may include a listing, table or other displayable data structure to display various templates of the processes of the organization. In one or more arrangements, each executable instance may have a specific corresponding template. In one or more alternative or additional arrangements, an executable instance may have multiple corresponding templates covering different use cases or scenarios. The list or table may include a description section that includes a description of the scenarios covered and/or functions performed by the executable instance (process) that is associated with the template. As a result, at step 4, a user may view the descriptions and select a template that is the most similar to his or her scenario or use case to satisfy a particular objective of the organization. As will be discussed in further detail below, each template may be user-editable to enable a user to tailor a template to a particular scenario.

As an example, a user of computing devices 302 may, via a graphical user interface, view a list of executable objects and determine that none of the listed executable instances will satisfy the requirements of his or her particular scenario. At step 4, the user may, via computing devices 302, select combinations of preset attributes (e.g., categories, tasks to be accomplished, relationships, or the like) from one or more dropdown lists of the user interface that best describes and/or otherwise characterizes the user's particular scenario. Search attributes describing the user's particular scenario may include, but are not limited to, data input triggers, input types, output types, activity or processing types, number of activities, scheduling, resource types, alerts, product type, or the like. Other search attributes may include process name, author, creation date, version, department, role, group, category, classification, or the like. The user interface may also enable user-selection of relationships between the attributes. As an example, the user may select one activity and link its output with the input of another activity to define a handoff.

At step 5, using the selected attributes/relations and the configuration file, computing devices 302 may generate and transmit a search query representative of the selected attributes and relations to centralized controller 310. In some instances, the search query may include an identifier (e.g., a tag) of each selected attribute and any user-defined relations between the selected attributes. At step 6, centralized controller 310 may then either modify the search query (or use the search query itself) to determine which templates, in a template database storing numerous templates for executable instances, match the selected attributes and relations. In some embodiments, the template database is a part of centralized controller 310. In other embodiments, the template database is remote from (but communicatively coupled to) centralized controller 310.

At step 7, centralized controller 310 may transmit the query results (e.g., information identifying the matching templates such as template identifiers and associated description) to computing devices 302. A matching template may be a template that matches each of the selected attributes and relations. Further, centralized controller 310 may transmit information identifying templates (e.g., template identifiers and associated description) that might not match each (e.g., all) of the selected attributes but meet/match at least a threshold percentage of the selected attributes and relations. As an example, a template that meets 3 of 4 attributes may have its identifying information transmitted if the threshold percentage is e.g., 75 percent. In such an example, if another template meets 2 of 4 attributes, its identifying information might not be transmitted. Additionally or alternatively, centralized controller 310 may also transmit identifying information of templates that might not match each (e.g., all) of selected attributes and relations but meet/match specifically identified attributes and/or relations. As an example, the user may, in step 4, tag a particular attribute as being obligatory and/or another attribute as being optional. In such an example, centralized controller 310 may transmit identifying information for a template that has at least the obligatory attribute. Centralized controller 310 may rank order the identifying information (e.g., template identifiers/descriptions) based on the number of attributes and/or relations that the associated template matches with a higher ranking being awarded to templates having a greater number of matching attributes and/or relations.

While, in steps 5-7, centralized controller 310 is used by computing devices 302 to remotely query the template database, in one additional or alternative arrangement, template database may be directly queried by computing devices 302 without involvement of centralized controller 310. In yet another additional or alternative arrangement, the configuration may include the information from the template database so that computing devices 302 may locally perform the search without further involvement of the template database.

At step 8, computing devices 302 may display and/or otherwise present, via a graphical user interface, the listing of query results in ranked order. For instance, the listing may include the template identifiers and corresponding brief description for the templates having matching (or closely matching) templates to the selected attributes and/or relations. Additionally, the listing may identify which selected attributes and relations the template corresponding to the template identifier match, for example, to enable a user to determine the properties and characteristics of each template efficiently. Additionally, the graphical user interface may include one or more filters to further refine an order in which the template identifiers are listed and/or otherwise presented. For instance, the listing may be filtered by a specified attribute, relation, date, version, author, department, function, input type, output type, process performed, any other data field or characteristic described herein, or the like.

In some instances, the user may modify their query by having the computing devices repeat steps 4-8. That is, the user may select attributes and/or relations and the computing devices 302 may send a query representative of the selected attributes and/or relations to the centralized controller 310. Centralized controller 310 may then query the template database and send the search results to the computing devices 302 for display in ranked order. The user may modify their search and/or filter the search results until finding a template identifier corresponding to a template that best represents the parameters of a particular scenario or use case. In some embodiments, computing devices 302 (or centralized controller 310) may, using the configuration, automatically select the best-matching template based on attributes, relations, and/or other parameters selected by the user.

At step 9, the user may, via the graphical user interface, request a particular template (by e.g., selecting a particular template identifier) that best represents the attributes and relations to satisfy the parameters of their scenario. In response, computing devices 302 may transmit the request for the particular template, which may include its template identifier, to centralized controller 310. At step 10, centralized controller 310 may then use the template identifier to retrieve the requested template from the template database storing each of the templates. In some instances, centralized controller 310 may identify the user (e.g., via a user identifier included in the request), determine the user's privilege level and compare the user's privilege level with a minimum privilege level associated with the requested template. If the user's privilege level is greater than or equal to the minimum privilege level, centralized controller 310 may determine that the user is authorized to receive the requested template. If not, centralized controller 310 may determine that the user is not authorized to request the template and may fail to send the template to the user and/or may send a notification indicating that the user is not authorized to request the template to computing device 302 for display to the user.

In one or more embodiments, centralized controller 310 may determine whether to apply one or more sets of rules to the template, which may convert one or more user-configurable parameters to non-user-configurable parameters (e.g., fixed fields or fields with limited editable options) to prevent the user from modifying such parameters of the requested template. As a result, the user may manipulate and modify the template without violating the one or more applied rules.

As an example, centralized controller 310 may determine whether the requested template is identified (e.g., tagged) as a template being associated with rules (e.g., standards) for multiple different geographic regions, industries, and/or legal jurisdictions. If so, centralized controller 310 may identify a corresponding set of rules for the geographic region, industry, and/or legal jurisdictions in which an executable instance of the user-modified template (discussed below) is to be implemented. In some instances, the request for the template (received from computing devices 302) may include data identifying one or more of the particular geographic region, industry, and/or legal jurisdiction. In other instances, centralized controller 310 may use the geographic location of computing device 302 to determine the particular region and/or legal jurisdiction. In yet other instances, centralized controller 310 may send, to computing devices 302, a request for the user to specify the region, industry, and/or jurisdiction and, in response, receive an identification of the geographic region, industry, and/or jurisdiction.

Once the appropriate rules for the requested template have been identified, centralized controller 310 may apply these rules to the requested template. As an example, one or more user-configurable parameters may be converted to non-user-configurable parameters (e.g., fixed parameters). As another example, one or more user-configurable parameters may be limited in the available options or values for the one or more user-configurable parameters (e.g., the number of available options of a user-configurable parameter may be reduced). As a result, the user may be prevented from modifying one or more parameters/fields of the template so that an implementation of an executable instance associated with the modified template will comply with the rules for the particular geographic region, industry and/or legal jurisdiction.

At step 11, centralized controller 310 may transmit the requested template to computing devices 302. At step 12, computing devices 302 may display, via a graphical user interface, the requested template to the user so that the user may update the template using the user-configurable parameters in order to conform and/or otherwise tailor the template to a particular scenario. Each template may be associated with a particular executable instance (e.g., a process of the organization) and may include multiple user-configurable parameters and/or multiple editable fields. One user-configurable parameter may be an add new structured activity parameter. Another user-configurable parameter may be a modify a structured activity parameter. Yet another user-configurable parameter may be a remove a structured activity parameter. Still yet another user-configurable parameter may be linking the output of one or more structured activities to the input of one or more other structured activities.

The user-configurable parameters may be in the form of toolkits having user-selectable menus and fields. Each toolkit may be representative and/or otherwise associated with one or more phases of a process-management lifecycle including, for example, one or more design, modeling, execution, monitoring, or optimization phases. A design-phase toolkit may be associated with the design phase and permit the user to identify and modify current processes (e.g., activities or tasks which hand-off and/or otherwise flow to other activities or tasks). The design-phase toolkit may also enable the user to define new processes for use in a system. The user may, in addition to defining one or more activities or tasks, define hand-off triggering events to one or more other generated (or previously defined) activities or tasks. Additionally, the user may define prioritization among various processes. For instance, the user may define rules of what steps to take to resolve conflicts between processes. As an example, the user may define such a conflict to trigger the computing system to send a notification of the conflict to the user or another specified person via electronic mail, text message, or the like. Additionally, the user may select documents (e.g., agreements, legal standards, engineering standards, industry standards, or the like) to govern one or more of the processes.

A modeling-phase toolkit may be associated with a modeling phase of the lifecycle and may permit the user to define system-specific variables for use in modeling the processes. For instance, the variables may include costs, labor, schedule, or the like. An execution-phase toolkit may be associated with the execution phase of the lifecycle and may permit the user to define rules that govern behavior of the processes when they are executed by the computing system.

A monitoring-phase toolkit may be associated with the monitoring phase of the lifecycle and may permit the user to define metrics by which success or failure of each of the processes may be measured. For instance, the user may define how long a task of a process should take to complete for use during the monitoring phase. For instance, the user-defined timeframe may be compared with the actual time taken to complete that task during the monitoring phase. Further, the user may define successful outputs (e.g., outcomes) and unsuccessful outputs or errors. As a result, during the monitoring phase, the computing system may compute a success rate and/or an error rate for a process. The user may define and/or link process-evaluation documents to the template so that the user may access them during the monitoring phase. The user may also define what various statuses of a process mean (e.g., whether a particular status is indicative of an error or some other metric). An optimization-phase toolkit may be associated with the optimization phase of the lifecycle and may permit the user to define how data from the monitoring phase is displayed (e.g., to enable the user to identify frequent problem areas in the business processes and apply appropriate optimization techniques during an optimization phase of the lifecycle).

User-configurable parameters or fields may permit the user to tailor the template to a particular scenario. One or more user-configurable parameters may include defining classification rules (e.g., to categorize data), defining particular fields and ranges for various data. For instance, one or more parameters may include defining fields for estimated budget, amount spent, amount of budget remaining, project, schedule (activities in current period, activities in next period, lag time), status, man hours, exception handling, personnel access (login), number of people involved, input volume (requests), benefits, notes, location, agenda, meetings, or the like. Other user-configurable parameters may include data input triggers, input types, output types, activity or processing types, number of activities, scheduling (e.g., Gantt charts), resource types, alerts (e.g., alert trigger, alert content fields), product type, or the like. One or more user-configurable parameters may associate and/or link documents to the template (e.g., agreements, standard operating procedures, checklists, guides, frequently asked questions, or the like). Additionally or alternatively, the user-configurable parameters may specify one or more encryption, routing, compression, data-translation, or data-packaging activities.

One or more user-configurable parameters may be related to detection and handling of errors. The user may define various errors and how the error is to be handled (e.g., reroute the data, generate an error report, or the like). The user may define error fields to allow the user (or other users) to enter a description of a newly encountered error, how to reproduce the error, and/or how the data or process was affected by the error.

Computing devices 302 may generate metadata for the modified template. In some instances, one or more fields of the metadata may be specified by the user. The template metadata may include a template identifier, version number, author, description of scenario, creation date, department, role, group, category, classification, or the like.

At step 13, computing device 302 may transmit data representative of the modified template and its metadata to centralized controller 310. At step 14, centralized controller 310 may generate an executable instance based on the modified template. Centralized controller 310 may also store the modified template as a new template in the template database. Centralized controller 310 may also store the modified template's metadata in the template database.

Figure 4D:
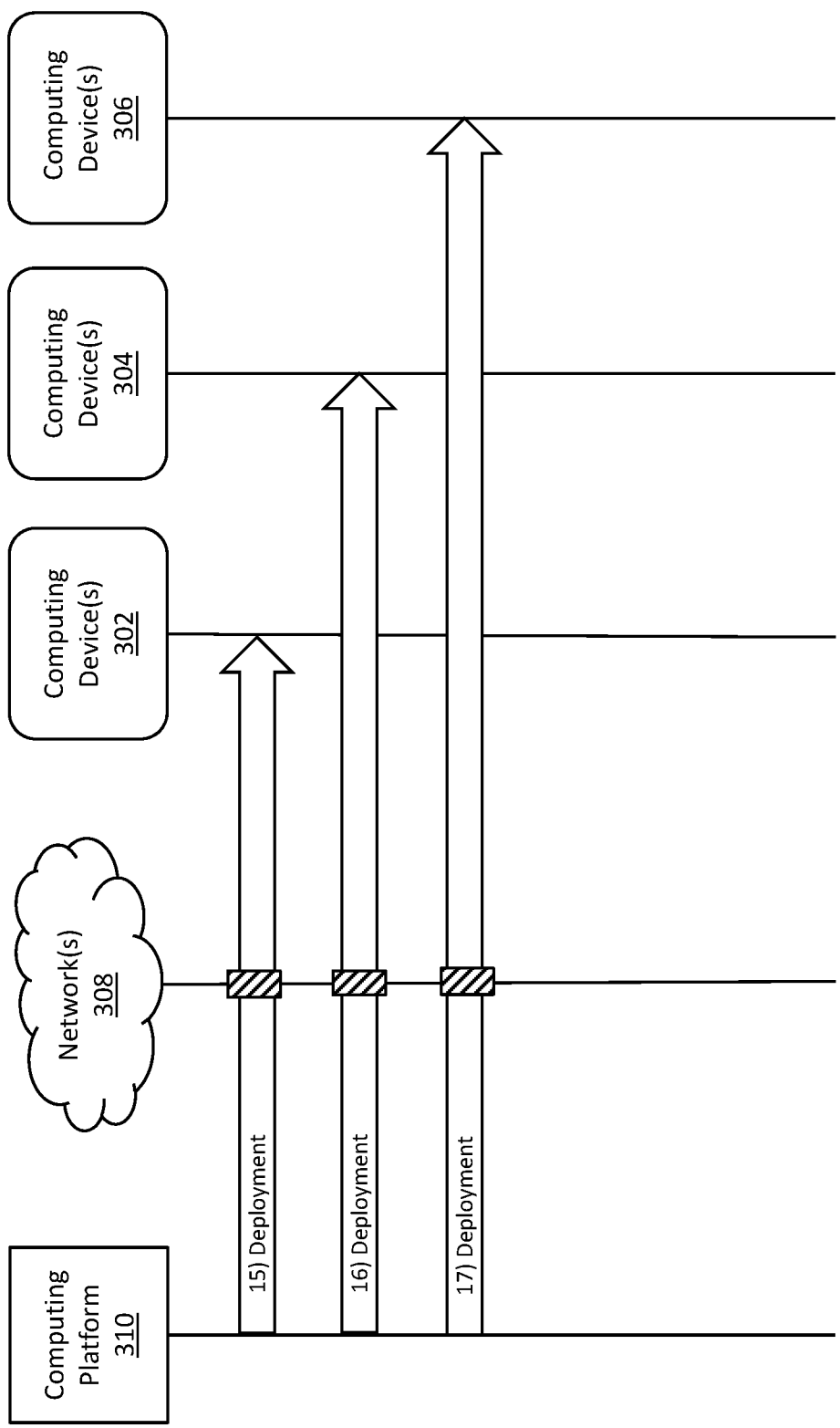

At steps 15-17, centralized controller 310 may reconfigure computing system 300 in another single deployment of the solution. As shown in FIG. 4D, centralized controller 310 may, in step 15, deploy an updated configuration to computing devices 302 for installation by computing devices 302. In the same deployment, centralized controller 310 may, in step 16, deploy the updated configuration to computing devices 304 for installation by computing devices 304. In the same deployment, centralized controller 310 may, in step 17, deploy the updated configuration to computing devices 306 for installation by computing devices 306. While the deployment is shown in three steps, centralized controller 310 may reconfigure computing system 300 in a single deployment by deploying the same configuration to each of the computing devices 302-306. In some embodiments, the configuration may be sent to each of the computing devices 302-306 substantially contemporaneously (e.g., within a preset timeframe). By using a single deployment package (e.g., a single image) to deploy the updated configuration, the computing system 300 may eliminate multiple separate manual deployments and reduce overhead.

Once deployed, a computing system may execute any of the executable instances. As an example, computing devices 304 may execute an executable instance associated with the originally requested template. As another example, computing devices 302 may execute the newly generated executable instance associated with the updated template in accordance with one or more user-defined events.

Figure 5:
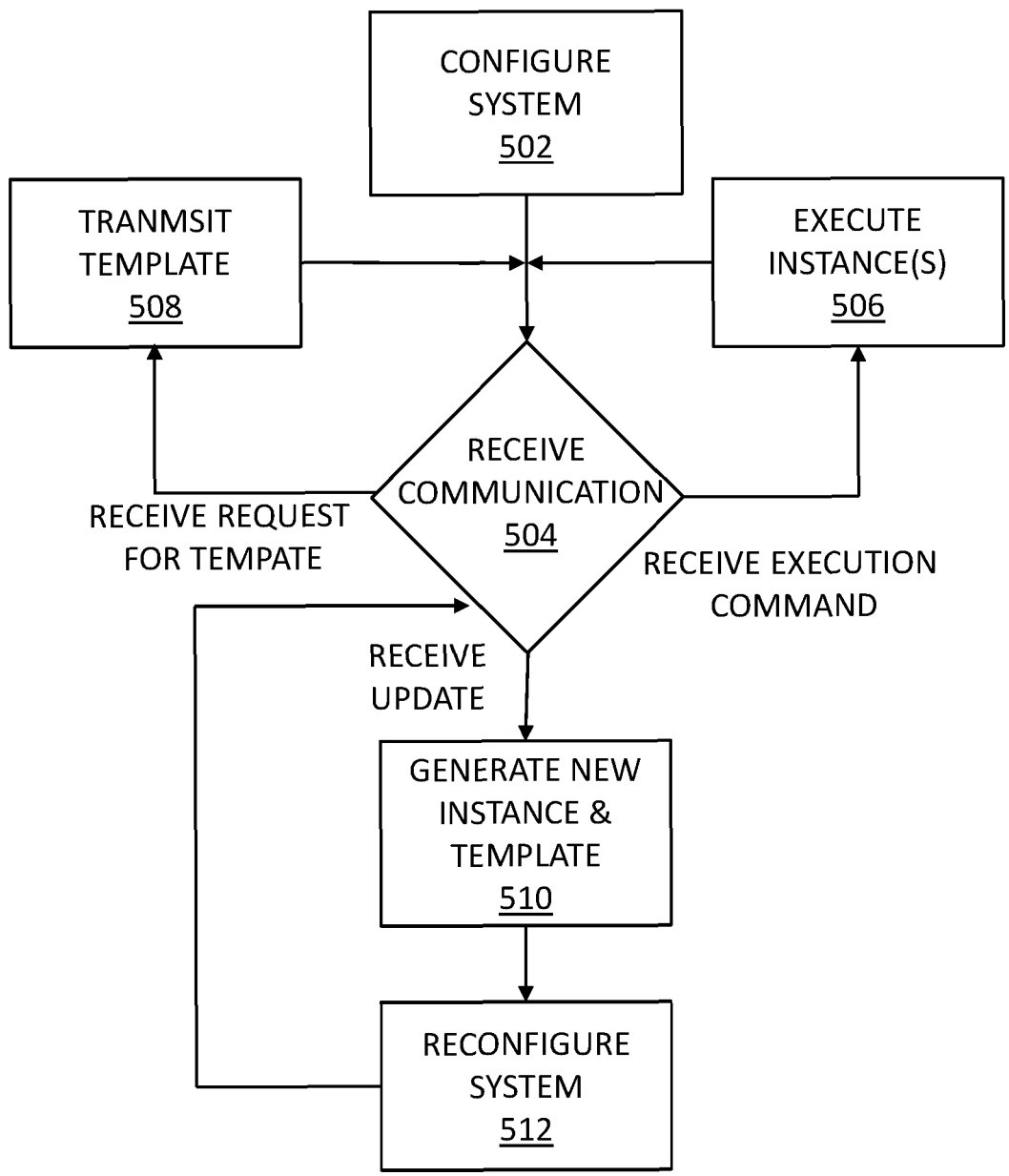
FIG. 5 depicts an illustrative method for deploying and managing executable process-management engines in accordance with one or more example embodiments.

FIG. 5 depicts an illustrative method for deploying and managing executable process-management engines in accordance with one or more example embodiments. Referring to FIG. 5, at step 502, centralized controller 310 may configure a computing system in a single deployment. For instance, centralized controller 310 may transmit a single image of the configuration to computing devices 302-306 for installation.

At step 504, centralized controller 310 may receive a communication from a computing system (e.g., computing devices 302). If the received communication is an execution command for an executable instance, centralized controller 310 may, at step 506, execute the executable instance to perform a process. If the received communication is a request for a template, centralized controller 310 may, at step 508, transmit the requested template to computing devices 302. If the received communication is an updated template, centralized controller 310 may, at step 510, generate a new executable instance and template based on the updated template. At step 512, centralized controller 310 may reconfigure the system. Centralized controller 310 may then repeat steps 504-512.

In some instances, in generating a new executable instance and template based on the updated template (e.g., at step 510), centralized controller 310 may generate the new template by merging a plurality of different templates, such as a first source template (which may, e.g., be the same as or similar to the first template of the plurality of templates) and a second source template of the plurality of templates. For example, if the communication from the computing system (e.g., computing devices 302) received by centralized controller 310 at step 504 is and/or includes an updated template, centralized controller 310 may, at step 510, generate a second executable instance of the executable process and a second template associated with the second executable instance based on the updated first template. In addition, generating the second executable instance of the executable process and the second template associated with the second executable instance based on the updated first template may include merging the first template with a third template to produce the second template. The third template (which may, e.g., be used in the merging) may, for instance, be different from the first template and the second template and may, for instance, be obtained from the template database, from the user, and/or from another source. For example, in generating the second executable instance of the executable process and the second template associated with the second executable instance based on the updated first template, centralized controller 310 may merge the first template with a third template to produce the second template, and each of the first template, the second template, and the third template may be different templates.

In some embodiments, merging the first template with the third template to produce the second template may include selectively combining one or more elements of the first template with one or more elements of the third template to produce the second template. For example, in merging the first template with the third template to produce the second template, centralized controller 310 may selectively combine one or more elements of the first template with one or more elements of the third template to produce the second template. For instance, the second template (which may, e.g., result from the merging of other templates) may have hybrid variables (e.g., rather than static variables) that result from different templates interacting with each other and/or from identifying the common elements among different templates. As a result, where non-merged templates may have been executed sequentially, different actions associated with different templates resulting in the merged template may be executed in parallel. In other words, distinct systems may, in some instances, generate their own versions of a template, which may be merged with either common elements and/or differentiated elements to form a singular template (e.g., a hybrid template) that is sequentially executable (e.g., by centralized controller 310). Additionally or alternatively, data elements at the intersection of the templates being merged may create a streamlined layer that may be called upon and/or otherwise used by centralized controller 310 going forward.

In some embodiments, the first template may be associated with a first process, and the third template may be associated with a second process different from the first process. For example, the templates being merged by centralized controller 310 (which may, e.g., be the first template and the third template used by centralized controller 310 in producing the second template) may be associated with different processes, such as different business processes.

In some embodiments, the first template may be associated with a first process engine, and the third template may be associated with a second process engine different from the first process engine. For example, the templates being merged by centralized controller 310 (which may, e.g., be the first template and the third template used by centralized controller 310 in producing the second template) may be associated with different process engines, such as different business process engines and/or different computer systems. For instance, a first business process engine system may perform a first set of actions and a second business process engine system may perform a second set of actions. In merging templates to produce the second template, centralized controller 310 may produce a template that merges the functions of both the first business process engine system and the second business process engine system into a template that is executable by a single business process engine system.

In some embodiments, the first process engine might not interact with the second process engine. For instance, the first business process engine system and the second business process engine system in the preceding example might not interact with each other, and thus by merging templates to produce the second template (which may, e.g., be considered a merged hybrid template), centralized controller 310 may improve usage of computing resources and/or otherwise improve computing efficiency, as the second template produced by centralized controller 310 can be executed by a single business process engine system.

In some embodiments, the second template may define a series of activities that are sequentially executable in a serial stream by a single computer system. For example, the second template (which may, e.g., be produced by centralized controller 310 by merging the first template and the third template) may define a series of activities that are sequentially executable in a serial stream by a single computer system, such as centralized controller 310 or another computer system, rather than existing as separate templates defining separate activities that are executable on separate systems. Indeed, in contrast to a static template, a merged hybrid template may be produced in a scenario in which a business process engine interacts with other business process engines that are not in its frame. The merged hybrid template may have and/or share some of the same parameters as the original static templates that were combined to form the merged hybrid template, as this may allow one business process engine to take components from another business process engine to satisfy some third end system. In this way, different business process engines may interact with each other to create a hybrid view.

In addition, merged hybrid templates may be applied and/or otherwise utilized in scenarios involving various executable processes, such as executable business processes in which a business process engine collects data, validates data, transforms data, and/or outputs data. Such a merged hybrid template may enable a business process engine to easily repeat a particular process without having to have the process be redefined prior to every instance. For example, one business process engine may be configured to generate account numbers for new credit card accounts, and another business process engine may be configured to detect unauthorized activity in credit card accounts. A merged hybrid template may connect the two business process engines so that a single interleaved process may be executed (e.g., by centralized controller 310), rather than having each business process engine execute its respective functions sequentially.

In some embodiments, reconfiguring the computing system based on the second executable instance of the executable process may include reconfiguring the computing system based on the second executable instance of the executable process while maintaining the configuration of the computing system based on the first executable instance. For example, in reconfiguring the computing system based on the second executable instance of the executable process at step 512, centralized controller 310 may reconfigure the computing system based on the second executable instance of the executable process while maintaining the configuration of the computing system based on the first executable instance.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular data types when executed by one or more processors in a computer or other data processing device. The computer-executable instructions may be stored on a computer-readable medium such as a hard disk, optical disk, removable storage media, solid-state memory, RAM, or the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), or the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and/or one or more depicted steps may be optional.

What is claimed is:

1. A method comprising:
at a centralized controller comprising, at least one processor, a memory, and a communication interface:
configuring, by the at least one processor, a computing system in a single deployment of an executable process, wherein the executable process comprises a plurality of executable instances corresponding to different sets of structured activities, wherein each executable instance is associated with a template, of a plurality of templates for the executable process, comprising a plurality of user-configurable parameters at least including an add new structured activity parameter, a modify a structured activity parameter, and a remove a structured activity parameter;
in response to receiving a request for a first template of the plurality of templates, outputting, by the at least one processor, the first template, wherein the first template is associated with a first executable instance of the executable process;
receiving, by the at least one processor, an updated first template associated with the first template, wherein the updated first template comprises an update to the first template via one or more of the plurality of user-configurable parameters;
generating, by the at least one processor, a second executable instance of the executable process and a second template associated with the second executable instance based on the updated first template, wherein generating the second executable instance of the executable process and the second template associated with the second executable instance based on the updated first template comprises merging the first template with a third template to produce the second template, and wherein the third template is different from the first template and the second template;
reconfiguring, by the at least one processor, the computing system based on the second executable instance of the executable process; and
executing, by the at least one processor, the second executable instance of the executable process on a user-specified data set.

2. The method of claim 1, wherein merging the first template with the third template to produce the second template comprises selectively combining one or more elements of the first template with one or more elements of the third template to produce the second template.

3. The method of claim 2, wherein the first template is associated with a first process, and the third template is associated with a second process different from the first process.

4. The method of claim 2, wherein the first template is associated with a first process engine, and the third template is associated with a second process engine different from the first process engine.

5. The method of claim 4, wherein the first process engine does not interact with the second process engine.

6. The method of claim 1, wherein the second template defines a series of activities that are sequentially executable in a serial stream by a single computer system.

7. The method of claim 1, wherein reconfiguring the computing system based on the second executable instance of the executable process comprises reconfiguring the computing system based on the second executable instance of the executable process while maintaining the configuration of the computing system based on the first executable instance.

8. The method of claim 1, comprising:
executing, by the at least one processor, the first executable instance of the executable process on a different-specified data set.

9. The method of claim 1, comprising:
determining, by the at least one processor, a geographic region for an implementation of the second executable instance;
determining, by the at least one processor, a set of rules specific to the geographic region of a plurality of sets of rules corresponding to different geographic regions; and
applying, by the at least one processor, the set of rules specific to the geographic region to the first template prior to outputting the first template, wherein the applied set of rules specific to the geographic region are configured to prevent a user from modifying at least one of one or more fields of the first template or one or more structured activities of a set of structured activities associated with the first template such that compliance of the implementation of the second executable instance with the set of rules specific to the geographic region is maintained.

10. The method of claim 9, comprising:
determining, by the at least one processor, a particular industry, of a plurality of industries, for an implementation of the second executable instance;
determining, by the at least one processor, a set of industry standards for the implementation based on the particular industry; and
applying, by the at least one processor, the set of industry standards to the first template prior to outputting the first template, wherein the applied set of industry standards are configured to prevent a user from modifying at least one of one or more fields of the first template or one or more structured activities of a set of structured activities associated with the first template such that compliance of the implementation of the second executable instance with the set of industry standards is maintained.

11. The method of claim 10, comprising:
determining, by the at least one processor, a set of legal standards for an implementation of the second executable instance; and
applying, by the at least one processor, the set of legal standards to the first template prior to outputting the first template, wherein the applied set of legal standards are configured to prevent a user from modifying at least one of one or more fields of the first template or one or more structured activities of a set of structured activities associated with the first template such that compliance of the implementation of the second executable instance with the set of legal standards is maintained.

12. The method of claim 1, comprising:
in response to receiving a request for the second template of the plurality of templates, outputting, by the at least one processor and via the communication interface, the second template;
receiving, by the at least one processor and via the communication interface, an updated second template associated with the second template, wherein the updated second template comprises an update to the second template via one or more of the plurality of user-configurable parameters;
generating, by the at least one processor, a third executable instance of the executable process and a fourth template associated with the third executable instance based on the updated second template;
reconfiguring, by the at least one processor, the computing system based on the third executable instance of the executable process while maintaining the configuration of the computing system based on the second executable instance; and
executing, by the at least one processor, the third executable instance of the executable process on a different user-specified data set.

13. The method of claim 1, wherein each executable instance, of the plurality of executable instances, are associated with a different process, and wherein each activity is associated with one of design, modeling, execution, monitoring, and optimization of the different process.

14. The method of claim 1, wherein a particular set of structured activities comprises one or more of an encryption activity, a routing activity, a compression activity, a data translation activity, or a data packaging activity.

15. The method of claim 1, comprising:
displaying, by the at least one processor, via a user interface, the first template comprising a plurality of fields, a set of structured activities in a workflow model, and the plurality of user-configurable parameters; and
receiving, by the at least one processor, user input, via one or more of the plurality of user-configurable parameters, to manipulate the first template to create the updated first template.

16. The method of claim 15, comprising:
receiving, by the at least one processor, user input to specify one or more user-defined events,
wherein the second executable instance is configured to execute in accordance with the one or more user-defined events.

17. The method of claim 1, comprising:
determining, by the at least one processor, a privilege level of a user associated with the request; and
wherein the outputting is in response to determining that the privilege level of the user is greater than or equal to a privilege level associated with the first template.

18. An apparatus comprising:
a processor; and
a memory storing computer-readable instructions that, when executed by the processor, cause the apparatus to:
configure a computing system in a single deployment of an executable process, wherein the executable process comprises a plurality of executable instances corresponding to different sets of structured activities, wherein each executable instance is associated with a template, of a plurality of templates for the executable process, comprising a plurality of user-configurable parameters at least including an add new structured activity parameter, a modify a structured activity parameter, and a remove a structured activity parameter;

in response to receiving a request for a first template of the plurality of templates, output the first template, wherein the first template is associated with a first executable instance of the executable process;

receive an updated first template associated with the first template, wherein the updated first template comprises an update to the first template via one or more of the plurality of user-configurable parameters;

generate a second executable instance of the executable process and a second template associated with the second executable instance based on the updated first template, wherein generating the second executable instance of the executable process and the second template associated with the second executable instance based on the updated first template comprises merging the first template with a third template to produce the second template, and wherein the third template is different from the first template and the second template;

reconfigure the computing system based on the second executable instance of the executable process; and execute the second executable instance of the executable process on a user-specified data set.

19. The apparatus of claim 18, wherein merging the first template with the third template to produce the second template comprises selectively combining one or more elements of the first template with one or more elements of the third template to produce the second template.

20. One or more non-transitory computer-readable media storing instructions that, when executed by an apparatus comprising, a processor and a memory, cause the apparatus to:

configure a computing system in a single deployment of an executable process, wherein the executable process comprises a plurality of executable instances corresponding to different sets of structured activities, wherein each executable instance is associated with a template, of a plurality of templates for the executable process, comprising a plurality of user-configurable parameters at least including an add new structured activity parameter, a modify a structured activity parameter, and a remove a structured activity parameter;

in response to receiving a request for a first template of the plurality of templates, output the first template, wherein the first template is associated with a first executable instance of the executable process;

receive an updated first template associated with the first template, wherein the updated first template comprises an update to the first template via one or more of the plurality of user-configurable parameters;

generate a second executable instance of the executable process and a second template associated with the second executable instance based on the updated first template, wherein generating the second executable instance of the executable process and the second template associated with the second executable instance based on the updated first template comprises merging the first template with a third template to produce the second template, and wherein the third template is different from the first template and the second template;

reconfigure the computing system based on the second executable instance of the executable process; and execute the second executable instance of the executable process on a user-specified data set.

* * * * *